United States Patent [19]
Kindt-Larsen et al.

[11] Patent Number: 5,542,978
[45] Date of Patent: Aug. 6, 1996

[54] APPARATUS FOR APPLYING A SURFACTANT TO MOLD SURFACES

[75] Inventors: Ture Kindt-Larsen, Holte, Denmark; Stephen R. Beaton, Neptune Beach, Fla.; Wallace A. Martin, Orange Park, Fla.; Craig W. Walker, Jacksonville, Fla.

[73] Assignee: Johnson & Johnson Vision Products, Inc., Jacksonville, Fla.

[21] Appl. No.: 258,263

[22] Filed: Jun. 10, 1994

[51] Int. Cl.⁶ ............................................. B05C 1/00
[52] U.S. Cl. .................. 118/256; 118/263; 118/264; 118/268; 425/98; 425/808
[58] Field of Search ......................... 118/256, 263, 118/264, 268; 264/338; 425/90, 98, 808; 65/24, 26, 169, 170; 427/133, 135; 164/472, 473, 72, 267; 29/424

[56] References Cited

U.S. PATENT DOCUMENTS

| | | | |
|---|---|---|---|
| 4,064,208 | 12/1977 | Hanning | 264/338 |
| 4,640,489 | 2/1987 | Larsen | 249/122 |
| 4,680,336 | 7/1987 | Larsen et al. | 524/548 |
| 5,039,459 | 8/1991 | Kindt-Larsen et al. | 264/2.6 |
| 5,264,161 | 11/1993 | Druskis et al. | 264/2.6 |

FOREIGN PATENT DOCUMENTS 0251367  1/1988  European Pat. Off. ............... 264/338

*Primary Examiner*—Laura Edwards

[57] ABSTRACT

A method of and apparatus for employing a surfactant which is provided in order to assist in the release from each other of mold components of a multi-part mold employed in the molding of polymeric articles; for instance, such as a hydrophilic contact lens, upon completion of the molding process for the polymeric articles. The surfactant is applied in the form of a film or coating on surface portions of one of the mold components in order to facilitate the disengagement between the mold components during demolding, and the removal of excess polymeric molding material adhesively deposited on surfaces thereon.

14 Claims, 4 Drawing Sheets

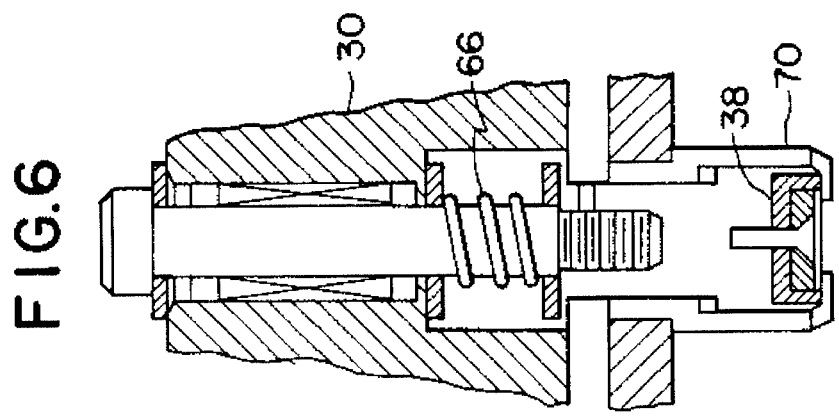
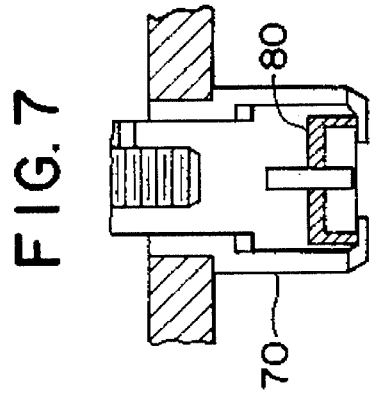
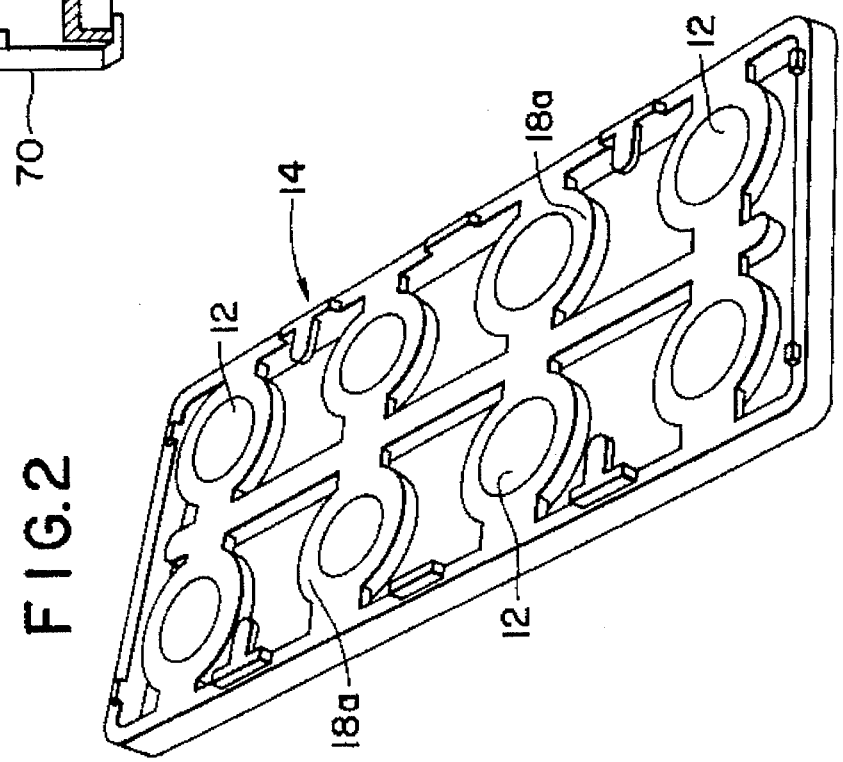

APPARATUS FOR APPLYING A SURFACTANT TO MOLD SURFACES

BACKGROUND OF THE INVENTION

1. Field of the Invention

The present invention relates to a method of employing a surfactant which is provided in order to assist in the release from each other of mold components of a multi-part mold employed in the molding of polymeric articles; for instance, such as a hydrophilic contact lens, upon completion of the molding process for the polymeric articles.

The method pursuant to the invention also contemplates the application of the surfactant in the form of a film or coating on surface portions of one of the mold components in order to facilitate the disengagement between the mold components during demolding, and the removal of excess polymeric molding material adhesively deposited on surfaces thereon; which, for example, may be in the shape of rings formed externally of the respective mold cavities for the contact lenses, and which are formed through the displacement of polymeric material from the mold cavity.

Moreover, pursuant to a further aspect of the invention, there is provided a novel and unique apparatus which is adapted to effectuate the application of a coating or film containing a surfactant to surfaces of a mold component for molding hydrophilic polymer articles, especially such as hydrophilic contact lenses or the like. Accordingly, any excess molding material encountered during the molding of the contact lenses which is expelled from the mold cavities and resultingly adhesively deposited in the shape of rings on surface portions between the mold components located externally about the mold cavities, can be easily and cleanly removed upon heat separation of the mold components in view of the presence of the surfactant coating or film. This also facilitates the essentially undamaged removal of the molded articles from the mold cavities during separation of the components thereof upon completion of the molding process for the articles.

An extensive array of methods is currently employed in this technology in carrying out the manufacture of hydrophilic polymer articles, such as hydrophilic contact lenses, through the implementation of a considerable variety of processes; among which there are included spin casting, static cast molding, lathing, combinations of casting and lathing, and particularly frequently, through the use of two-part molds. In the utilization of separable two-part molds for the molding of hydrophilic contact lenses, upon completing the molding step it is of critical importance to be able to release the hydrophilic contact lenses from their surface engagement with and adherence to the mold parts, or at least one of the mold halves, without causing any damage to the contact lenses upon separating the mold parts, which would render the lenses unusable. Various concepts employed for effectuating the release of hydrophilic contact lenses from surfaces of molds, particularly two-part molds which are intended to be physically separated, are through the employment of laser or infrared heat mold part separating devices, the use of external heat and/or the application of heated gas, hot air or steam. However, all too frequently, damage is sustained by the contact lenses during removal thereof from the molds in that the material of the mold parts may exhibit a tendency to adhere and inhibit easy release upon effectuating separation of the mold parts. This potential damage which generally renders the contact lenses unable to meet necessary quality and/or inspection standards may consist of tears, nicks or other surface defects formed in the contact lenses, prevalent of which there may be the so-called "piece of material" (POM) defects caused by excess polymer debris or particles produced during molding permanently adhering to the contact lenses upon mold separation.

Generally, such mold parts for hydrophilic contact lenses consist of a curvilinear (concave/convex) center or front curve mold part adapted to form, in cooperation with a mating base mold curve part, a two-part mold for the contact lenses. Hydrophilic contact lenses of the type considered herein are usually constituted from a hydrophilic polymer, preferably a HEMA-based polymer (hydroxyethylmethacrylate), although other suitable monomers may comprise hydroxy ethyl acrylate (HEA), hydroxy propyl methacrylate, hydroxy propyl acrylate and hydroxy trimethyl ethylene acrylate, among numerous other applicable materials.

The components of the mold within which the hydrophilic polymer contact lenses are molded may consist of suitable pallets each including a plurality of cavities receiving mold parts having female and/or male base surfaces or curvilinear wall portions for the formation of the curved contact lenses and an annular rim portion extending thereabout. The molds as described, for instance in the molding technology, may be constituted from suitably selected conventional plastic materials, whereby the hydrophilic polymer articles; i.e. the contact lenses, will possibly adhere to one of the mold parts through the presence of mold parts having different properties or being formed of different materials. The mold parts may consist of plastic materials such as polyethylene, polypropylene, polystyrene, polyvinyl chloride among other suitable plastic mold materials, as is known in the technology.

In order to remove the molded hydrophilic contact lenses from the respective mold cavities, separation of the mold halves or portions is implemented, and the formed contact lenses may then be removed from the mold cavities. Due to excess portions of the polycyclic material of the hydrophilic contact lenses which are expelled from the mold cavities of the cooperating mold components, and which form ring-shaped elements of the HEMA-based polymer from which the contact lenses are made surrounding the exteriors of the mold cavities, and exhibit tendencies to strongly adhere to the mold surfaces on which the rings are deposited. These rings make separating of the mold cavities difficult, resulting in mold breakage and damage to the lenses. Further, the rings, or fragments thereof, become uncontrollable debris in automated production lines, contaminating both the production line and the final lens package. Moreover, the foregoing can also conceivably cause a perfectly "good" contact lens to be rejected after demolding due to the formed HEMA-ring or a portion thereof remaining on the front curve of the mold. This results in uneconomical production conditions being encountered during the manufacture of such contact lenses.

2. Discussion of the Prior Art

In order to implement the high-speed and mass-produced molding of such hydrophilic contact lenses, there have been developed two-part molds incorporating pallet-supported mold structures; for example, as disclosed in U.S. Pat. No. 4,640,489 to Larsen, and wherein methods of forming shaped polymeric hydrogel articles, such as hydrophilic contact lenses, are also elucidated in the disclosures of U.S. Pat. Nos. 4,680,336 and 5,039,459 to Larsen et al., wherein the last-mentioned two patents are assigned to the common assignee of the present application and the disclosures of which are incorporated herein by reference.

The release of hydrophilic contact lenses from adherent mold surfaces subsequent to the completion of the contact lens molding process can be facilitated or improved upon, as is set forth in the disclosure of U.S. Pat. No. 5,264,161 to Druskis et al. In that instance, surfactants are introduced in solution into a hydration bath employed in the molding cavities for molding the hydrophilic polymeric structures or contact lenses. The surfactant which is dispersed in the hydration bath in concentrations not exceeding 10% by weight aids in facilitating release of the lenses from adherent contiguous mold surfaces being separated, with the function of such surfactant being to reduce the surface tension properties of water or liquids, and to thereby reduce the level of adherence between components consisting, on the one hand, of the contact lenses and, on the other hand, the mold surfaces which become adherent during molding. Numerous types of surfactants are disclosed in this patent publication, particularly such as polymeric surfactants including polyoxyethylene sorbitan mono-oleates, and which are especially suitable for releasing in an undamaged state any hydrophilic polymer articles from adherent mold surfaces which are constituted of plastic materials. Nevertheless, the utilization of surfactants in suspension in a liquid hydration bath does not provide the desired control over the release of the hydrophilic polymer articles or contact lenses from the mold surfaces prior to hydration in the bath and, in particular, does not readily afford an easy removal of HEMA-based rings of molding material formed in adherence with mold surfaces extending about the mold cavities, or a more effortless separation between the mold component, whereby the rate of damage being encountered by the contact lenses upon mold separation and removal from the molds is still unacceptably high and is not readily controllable to a degree affording a satisfactory economic manufacturing environment.

SUMMARY OF THE INVENTION

Accordingly, in order to improve upon the ability of such hydrophilic polymeric articles, especially hydrophilic polymer contact lenses, of being inherently releasable in an undamaged state from the mold cavities of mold structures in which they are molded, the present invention contemplates the provision of a stamping station in a mold filling and assembling machine for the formation of hydrophilic polymer contact lenses which are ordinarily constituted from a HEMA-based plastic material, wherein a stamping head includes at least one stamp for applying a thin layer or film of a polymeric surfactant; in this instance, preferably a polyethylene oxide sorbitan mono-oleate, commercially sold under the tradename "Tween 80", to surface regions extending about the front curve of a mold part for the forming of contact lenses. This surfactant layer, in essence, assists in the separation of a mold part defining a base curve adapted to matingly cooperate with the front curve for molding a contact lens, and in the removal of excess molding material forming a HEMA-based ring extending externally of the mold cavity for each contact lens from any potential adhesion to the surfactant-coated mold part surface during demolding of the lens.

Pursuant to the invention, the novel stamping station which provides for the application of a thin layer of the polymeric surfactant to the surface portions extending about the front curve of the mold part, such as a flange surface, contemplates the positioning of a mold pallet containing the front curves of a two-part mold (which are adapted for subsequent mating with mold parts for molding the contact lens base curves) directly beneath a stamping head consisting of one or more stamps each adapted to engage respectively one of the surfaces or flange portions extending about the front curves located on the mold pallet. A pad which is impregnated with the surfactant; for instance, a polymeric surfactant such as "TWEEN 80", is moved beneath the stamping head and permitted to remain there while the stamps of the stamping head are moved downwardly into contact with the pad, and then retracted upwardly to allow the pad to be moved out from beneath the stamping head. The foregoing contacting between the stamps of the stamping head and the surfactant-impregnated pad resultingly causes each stamp to be wetted with the surfactant; in effect, the "TWEEN 80" surfactant. Thereafter, the stamping head is moved downwardly towards the mold pallet and enables the stamps to each respectively contact a therewith aligned surface or flange extending about a respective front curve positioned on the mold pallet, thereby depositing a very thin layer or film of the surfactant of controlled thickness onto the surface about each respective front curve. The stamping head with the stamps is then retracted upwardly and the machine sequences to the next mold pallet of front curves of a two-part contact lens mold while concurrently advancing the preceding surfactant-coated front curves on their mold pallet towards a station of the machine in which there is implemented the assembly of the back curve onto the front curve.

The application of a uniform thin layer or film of the surfactant to the various flange surfaces extending about each front curve of which the molding cavity has previously been filled with HEMA molding material for the contact lens and then subsequently matingly engaged by an associated base curve mold part after applying the surfactant, and on which flange surfaces there are deposited and adhered thereto HEMA-based rings of excess material from the molding material for each of the contact lenses, facilitates that subsequent to molding each contact lens can be removed from the respective mold cavity thereof during separation of the mold parts. The layer of surfactant which is applied or stamped onto the flange surface of the front curve may preferably, although not necessarily, be within the range of about 0.05 to 0.50 mg of surfactant for each front curve. This separation of the mold parts; in effect, between the front curves and base curves, is rendered easier due to the presence of the surfactant layer between the engaged circumferential edge surfaces of the respective front curve and base curve mold parts. Moreover, the surfactant on the flange or surface portion of the front curve mold part to which the HEMA-based ring of excess contact lens molding material expelled from the mold cavity adheres, reduces the degree of adhesion and enables the ready removal of the HEMA-based ring from each respective surface about the front curve, which during demolding results in a better than 95% removal rate of the HEMA ring without any damage being encountered by the contact lenses.

In accordance with another advantageous feature of the invention, the stamping head provides for a resiliently mounted multiple stamp structure enabling each individual stamp to "float" or be shiftable to some extent independently of the displacement of the other stamps in view of a spring-biased mounting construction for each stamp. This, in effect, will ensure that an even amount of pressure is applied to the surfaces or flanges extending about each front curve supported on the mold pallet upon being contacted by a respective stamp having a surfactant-wetted surface previously imparted thereto by the pad, so as to cause a uniformly thick layer or film of an equal amount of surfactant to be applied about each of the respective front curves.

As set forth herein, in accordance with a specific aspect of the invention, the pad for applying the surfactant to the stamps of the stamping head utilizes a unique material structure in that a substantially porous polyethylene pad; for example, of a thickness of within the range of approximately 0.25 to 0.50 inches and possessing a 10 micron average pore size, and supported on a liquid-impervious base, is employed to wick the surfactant from the bottom of the pad to the top of the latter when contacted by the downwardly displaced stamps. A nylon filter, for instance, having a mesh size within the range of about 0.50 to 2.0 microns, and preferably of a 1.2 micron mesh size, is supported on the top surface of this porous polyethylene pad, and acts as a metering device so as to permit only a very minor quantity of the surfactant to pass therethrough from the pad to the stamps of the stamping head for forming a thin surfactant layer or wetted surface thereon. This enables for highly precise control to be exercised over the amount of surfactant being passed through the nylon filter to the stamps and, thereafter upon withdrawal of the pad, to be deposited by the stamps on the surfaces or flanges extending about the front curves which are positioned on the mold pallet.

In comparison with the prior art, such as is represented by U.S. Pat. No. 5,264,161 to Druskis et al., which only discloses utilizing surfactants which are in suspension in a bath solution for improving upon the release of molded polymer articles from molds during separation, the present invention provides an improved control over the amounts of surfactant being in a novel manner distributed over and deposited on the applicable surface areas about the front curve mold part, thereby enabling removal of HEMA-based rings of molding material adheringly deposited about the front curves, with only a minimal danger of damage to the lenses being encountered, thereby also rendering the entire procedure and apparatus highly cost effective and economical in the manufacture of contact lenses of uniformly high quality.

Accordingly, it is an object of the present invention to provide an arrangement for depositing controlled amounts of a surfactant on mold surfaces to facilitate the separation of the mold parts, such as between front curves and base curves, enabling the removal of HEMA-based rings of excess molding material adhering to mold surfaces about the front curves, and thereby essentially eliminating contamination of the production line and the packages upon completion of the lens molding procedure.

Another object of the present invention resides in the provision of a method for depositing thin films of surfactants on mold part surfaces to assist in the separation during demolding of the mold parts, such as between front curves and base curves utilized for the molding of contact lenses, enabling the removal of HEMA-based rings of excess molding material adhering to mold surfaces about the front curves, and facilitating an essentially undamaged release of the molded contact lenses, utilizing the arrangement as described herein.

BRIEF DESCRIPTION OF THE DRAWINGS

Reference may now be had to the following detailed description of an exemplary embodiment of a stamping arrangement utilized for the application of a polymeric surfactant to surface portions extending about the front curves of a mold structure for molded polymeric articles, particularly such as hydrophilic polymer contact lenses, facilitating separation of the mold parts and removal of any HEMA-based rings of molding material adhering thereto, taken in conjunction with the accompanying drawings; in which:

FIG. 2 illustrates a perspective view of a frame assembly of front curves for the molding of contact lenses;

FIG. 6 illustrates, on an enlarged scale, a sectional detail of a single stamp of the stamping head of FIG. 4; and FIG. 7 illustrates, on an enlarged scale, a sectional detail of a brush-like single surfactant applicator, in a detail similar to that shown in FIG. 6.

DETAILED DESCRIPTION

Figure 1:
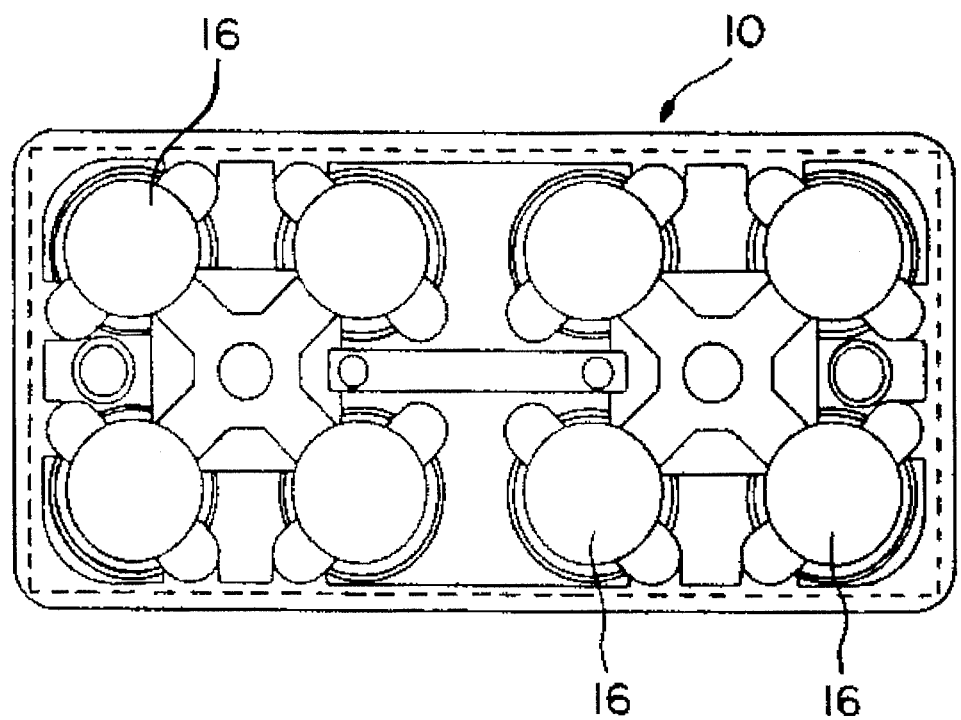
FIG. 1 illustrates a top plan view of a typical mold pallet of a two-part mold for selectively supporting thereon either the back or front curves employed for the molding of hydrophilic polymer contact lenses.
Figure 3:
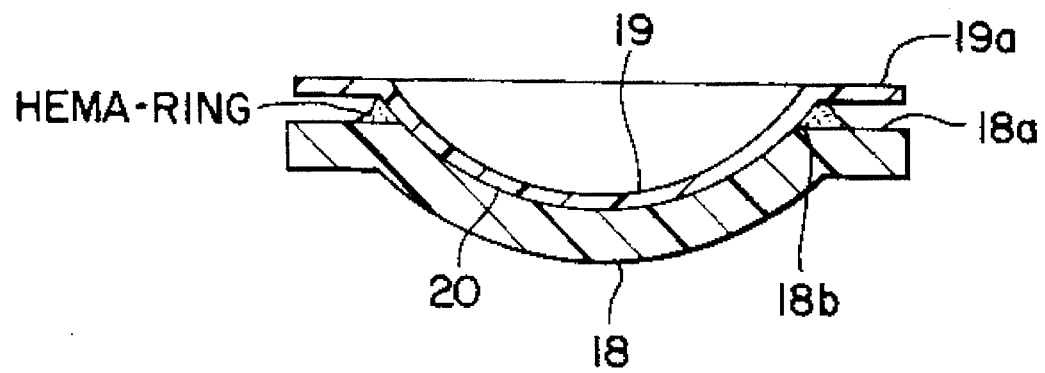
FIG. 3 illustrates a sectional, generally diagrammatic view through an assembled front curve and base curve arrangement for molding hydrophilic polymer contact lenses.

Referring now in more specific detail to FIGS. 1 to 3 of the drawings, there is illustrated a mold frame or pallet 10 of a suitable rigid material having recesses 16 which are adapted to mount front curve flanges 18 for molding, in cooperation with suitable base curves 19 each jointly forming therewith a two-part mold, in this instance, a plurality of eight hydrophilic polymer contact lenses (not shown). As is well known in the art as mentioned hereinabove, the material employed for the hydrophilic contact lenses maybe constituted of a HEMA-based (hydroxyethylmethacrylate) or equivalent material.

As shown in FIG. 2, the mold frame 14 comprises individual concave mold units 12 forming injection points for the molding material for the plurality of contact lenses which are to be molded, and is adapted to mate with convex mold units of a two-part mold. The frame structure of mold front curves of the two-part mold are somewhat different than those contemplated in FIGS. 1 and 3, although surfactant may be applied thereto in the same manner, as described hereinbelow.

Each concave mold unit 12 defines a front curve 18 for the containment of a monomer material for the subsequent molding of a contact leans, as shown in FIG. 3. Extending about the front curve is an integral flange 18a, joined to the front curve by means of an annular lip 18b extending about the mold cavity filled with HEMA-based lens molding material.

In order to provide the complete two-part mold, a second mold part comprising a base curve 19 is subsequently adapted to be matingly superimposed on the front curve 18, after the latter is supplied with a molding monomer, so as to form a molding cavity 20 for forming a contact lens therebetween, with the base curve 19 peripherally being seated on the annular lip 18b. The base curve 19 includes a radially outwardly extending annular flange 19a, and when parts 18, 19 are assembled, forms an annular gap with flange 18a, between which there is received excess HEMA-based molding material expelled from the molding cavity 20 so as to form a HEMA-ring which adheres to the adjoining flange surfaces.

Generally, the mold parts 18 and 19 are constituted of a suitable plastic material, such as a polyolefin including low, medium and high-density polyethylene, polypropylene, polystyrene, or other plastics which are adapted for this purpose; i.e. molding hydrophilic polymer contact lenses. Preferably, the mold part 19 is thinner and more flexible than the mold part 18. Specifics of such mold constructions, including the front curves and base curves for molding contact lenses, are known in the technology, having reference to U.S. Pat. No. 4,640,489 to Larsen, and are not discussed in more specific detail herein except as applicable to the invention.

Figure 4:
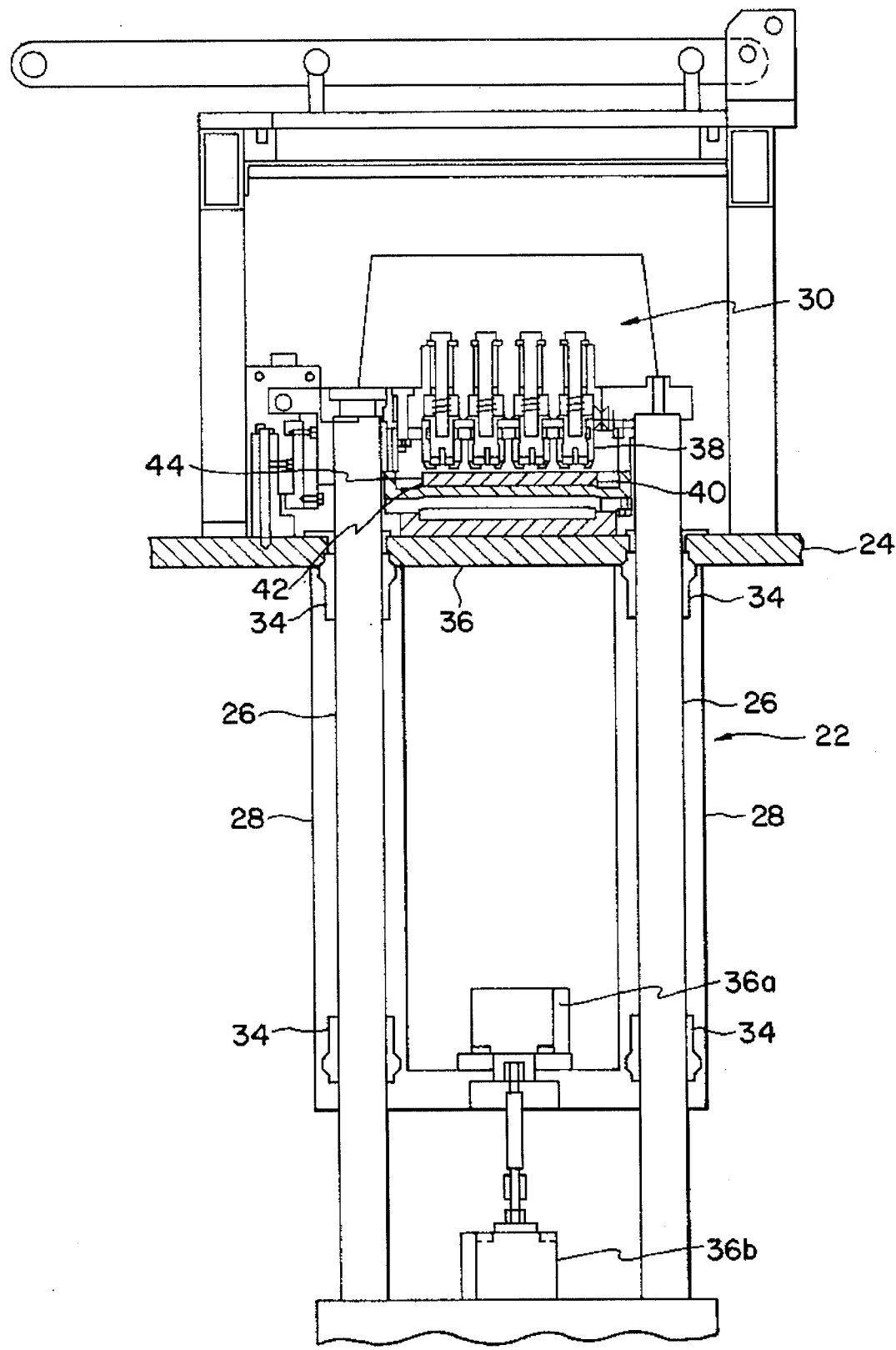
FIG. 4 diagrammatically illustrates a side elevational view of a stamping station for the application of a surfactant to a stamping head and thereafter for the deposition of a film of the surfactant onto surface portions on the front curves positioned on a contact lens molding pallet.
Figure 5:
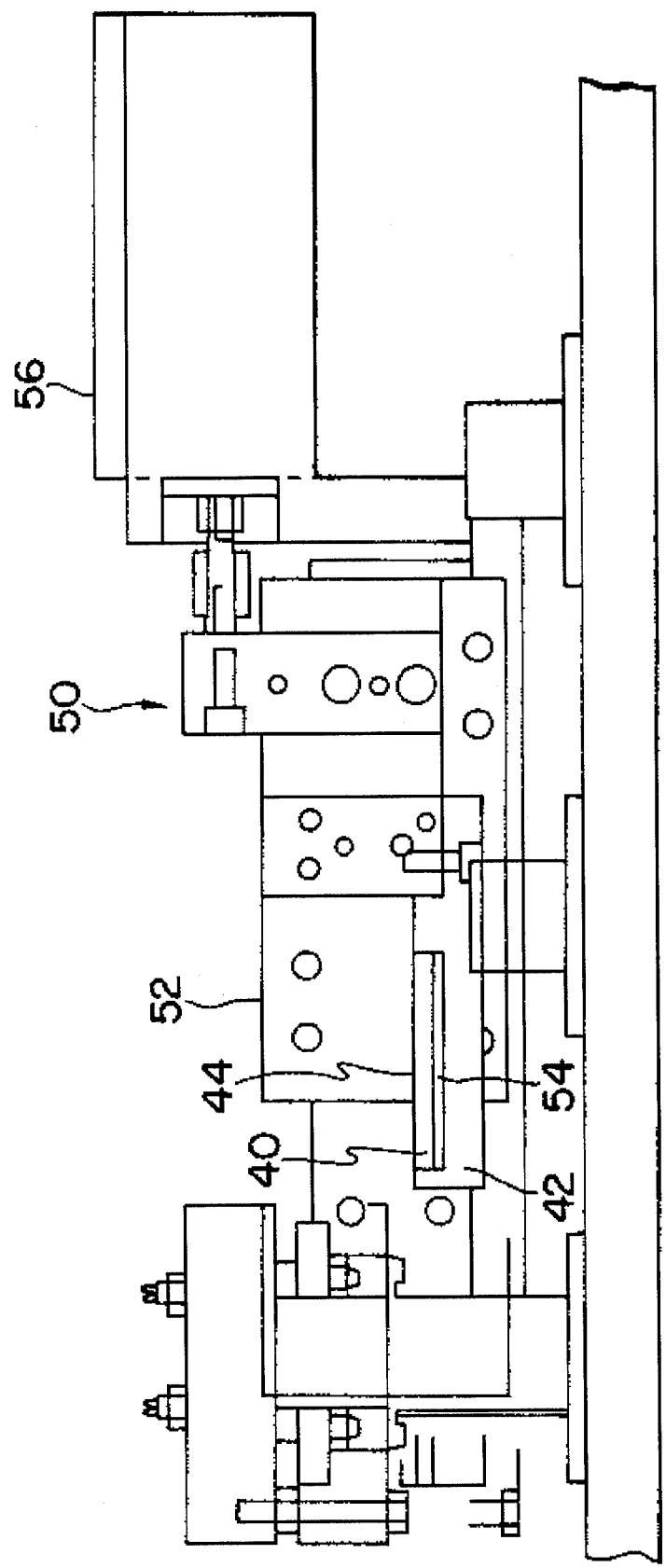
FIG. 5 illustrates a side view of the mechanism for moving the stamp pad under the stamping head of FIG. 4.

Referring now in greater specificity to the drawings as represented in FIGS. 4 through 6, there is illustrated a stamping station for applying a thin film or layer of a surfactant to the flange 18a surface of each respective front curve 18 which is located in each depression 12, 16 of, respectively, the mold pallet 10 of FIG. 1 or mold pallet 14 of FIG. 2. However, caution should be exercised to avoid applying surfactant to the lip 18b itself about the mold cavity, inasmuch as touching the lip with surfactant may cause a defect in the lens which is to be molded. The application of the surfactant layer or film to the surface 18a of the front curves 18 on the mold pallet 10 is intended to assist in the separation therefrom of the subsequently applied base curves 19 during demolding and in removing the HEMA-based rings which are adherent primarily to the surface of flanges 18 between the annular mold part flanges 18a, 19a at a demolding station subsequent to completion of the lens molding procedure, so as to reduce potential damage to the contact lenses being released from the mold cavities 20.

As illustrated in FIG. 4, the stamping station includes a frame structure 22 having a support member or base 24 on which there are positioned a plurality of spaced downwardly depending upright guide columns 28. These stationary columns 28 have slide members 26 vertically slidable therein for supporting components for a stamping head unit 30 so as to be vertically displaceable along the guide columns. The stamping head unit 30 is mounted for vertical reciprocation proximate the upper end of the columns 28 through the intermediary of suitable guide bushings 34 and the slide members 28, and wherein the vertical displacement is implemented through suitable actuating elements or drive units which are not described in further detail herein, and which, if desired, may be operated from a suitable control and sensor unit 36 on base 24 to activate cylinders 36a and 36b.

The stamping head unit 30 includes mounted thereon a plurality of stamps 38 each adapted to be moved in vertical reciprocatory movement in a coordinated manner in conjunction with the stamping head unit 30, wherein the number of stamps 38 is correlated with the number of front curves 18 located in the mold depressions 12, 16 formed in the respective mold pallet 10 or mold frame 14. Each stamp 38 consists of a composition of about 90% urethane and 10% silicone in at least the portions thereof which are adapted to contact the front curves on the mold pallet 10.

Adapted to be positioned in spaced relationship below the lower end of each stamp 38 of the stamping head unit 30 when the latter is in a raised position, is a horizontally shiftable pad member 40. The pad member 40 is basically a cushion which is constituted of a suitable porous material, such as porous polyethylene having an average 10 micron pore size, and which is impregnated with a solution containing a surfactant, the latter of which may be present in a highly concentrated state. The lower surface of the stamping pad member 40 is supported on a base 42 consisting of a liquid-impervious material. The upper surface of the pad member 40 is covered by a filter 44, preferably of nylon, having a mesh size within the range of about 0.5 to 2.0 microns so as to act as a metering device and allow only relatively small quantity of surfactant to pass therethrough as the surfactant is wicked from the bottom of the pad member 40 to the top upon the pad member being pressingly contacted by the bottom ends of the stamping heads 38, as described hereinbelow.

The stamping pad member 40 is supported on a horizontally shiftable carriage structure 50, as shown in FIG. 5, which is operable at a predetermined elevation below the lower ends of the stamps 38 on the stamping head 30, so as to be horizontally movable into position below the stamps 38 between the upright guide columns 26 or, alternatively, moved outwardly thereof when not needed. The carriage structure 50 includes a horizontally shiftable carriage 52 having a recessed portion 54 housing the pad member 40, with the bottom of the recess 54 either comprising or supporting the liquid-impervious base 42, as mentioned hereinabove. The horizontal shifting motion may be imparted to the carriage 52 and, resultingly, to the pad member 40, by means of a suitable actuating cylinder 56 which is operatively connected with the carriage 52.

The foregoing carriage structure 52 is located at an elevation or height above a mold pallet track (not shown), along which mold pallets 10 or 14 are adapted to be sequentially advanced into position below the stamping head unit 30 in order to enable the stamp 38 to apply a thin film or coating of surfactant to the surfaces 18a, 18b of the front curves 18 positioned thereon before being transported further in connection with the forming of the contact lenses.

OPERATION OF THE APPARATUS

In order to facilitate the deposition of a thin film layer of surfactant onto the flange surface 18a of the front curves 18 on the mold pallet 10 or frame 14 which has been positioned below the stamping head unit 30, the stamping head unit 30 is maintained in a fully raised position on slide members 26. This is implemented by means of a lifting cylinder arrangement 36a, 36b acting on slide members 26 so as to be vertically movable within the guide columns 28. The extent of vertical movement may be controlled by a suitable control and sensor arrangement. The pad member 40 is interposed in spaced relationship between a molding pallet 10 or 14 and the lower ends of the stamps 38 on the stamping head unit 30, which components are vertically superimposed with each other in spaced relationship. This interposition of the pad member 40 is carried out by shifting the carriage 52 so as to locate the pad member 40 beneath the stamps 38. Thereafter, the stamping head unit 30 is actuated so as to cause the stamps 38 to be displaced downwardly into predetermined contact with the upper surface of the filter 44 on the pad member 40, whereby a certain amount of surfactant is expelled upwardly through the nylon filter 44 and deposited on the lower downwardly facing surface of each stamp 38, forming a thin layer or coating of the surfactant thereon.

The surfactant with which the pad member 40 is impregnated may be a solution with an almost 100% concentrated strength of surfactant dispersed therein so as to enable forming a layer thereof on the therewith contacting surfaces of the stamps 38. Preferably, the surfactant is constituted of "TWEEN 80" (registered trademark); i.e. a Polysorbate 80. This is basically polyethylene oxide sorbitan mono-oleate or the like equivalent, and consists of an oleate ester of sorbitol and its anhydrides copolymerized with approximately 20 moles of ethylene oxide for each mole of sorbitol and sorbitol anhydrides; of generally the formula:

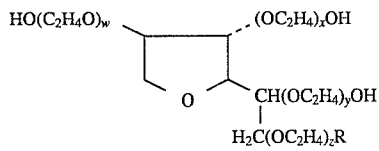

[Sum of w, x, y, z is 20; R is $(C_{17}H_{33})COO$]

In order to ensure that a uniform layer or very thin film of the surfactant is deposited on the surface 18a of each of the front curves 18 which are located on the mold pallet 10 or 14, each stamp 38 is individually resiliently mounted through the provision of a suitable biasing spring 66, preferably such as encompassing coil springs which are supported in the stamping head unit 30, ensuring that notwithstanding manufacturing tolerances, a uniform pressure will be subsequently exerted by the stamps against all contacting surfaces 18a, 18b on the front curves 18 which are located on the mold pallet. Thereafter, upon the surfactant being wicked up through the pad, expelled through the nylon filter 44 and deposited on the lower surface of each stamp 38, the stamping head unit 30 and stamps 38 are displaced upwardly, and the stamping pad member 40 with its carriage 52 is moved horizontally out of the stamping station from its position between the guide columns 26, thereby freeing the space between the stamps 38 and the therewith aligned front curves 18 on mold pallet 10 or 14. In order to prevent the front curves 18 from being pulled away from pallet 10 or frame 14 when the stamps 38 are raised, a shield 70 surrounding the stamps and which is at its upper end spring-biased against the bottom of a plate, is pressed against the mold curve flanges 18a and moves upwardly independently and subsequent to the upward movement of the stamps 38. Thereafter, the stamping head unit 30 is again shifted downwardly along the vertical guide columns 26 until the stamps 38 have their surfactant-wetted lower end surfaces contact the surfaces 18a, 18b on the front curves 18, thereby depositing a thin layer or film of the surfactant thereon, with such layer being at a uniform thickness on each respective front curve surface 18a, 18b due to the resilient biasing forces being exerted by each of the springs 66 acting on the individual stamps 38.

Thereafter, the stamping head unit 30 is again moved vertically upwardly along guide columns 26, and a subsequent molding pallet 10 or frame 14 mounting front curves 18 advanced into the stamping station of the apparatus, while the preceding molding pallet 10 or frame 14 which has the front curve surface thereon already treated with the surfactant is advanced out of the stamping station so as to be mated with base curves 19, as is known in the art. The process may then be repeated with the subsequently introduced front curves 18 on mold pallets 10 or frames 14 in the same continuous manner.

The foregoing structure enables the deposition of a thin and uniform layer or film of the surfactant onto specified flange surface 18a of the front curves 18 so as to enable easier subsequent separation of the base curves 19 therefrom and removal of the HEMA-based ring material excessed during the molding of the hydrophilic polymer contact lenses, upon completion of the molding sequence, and in the absence of damage being encountered by the molded contact lenses being released from the separated mold parts.

Although the invention has been primarily described in connection with the deposition or application of the surfactant through the intermediary of a stamping apparatus and method, other kinds of deposition of the surfactant to surfaces on the front mold curves readily suggest themselves to one of skill in the art. Instead of the surfactant being stamped, it is possible to contemplate the application of the surfactant to the surfaces of the mold part through the intermediary; for example, of painting or brushing, printing, wiping, dripping, dipping, among other possible methods.

As illustrated in the detail or fragmentary drawing of FIG. 7, in lieu of a stamp 38 as shown in FIG. 6, there may be provided a brush 80 adapted to contact specific surface portion 18a of a front curve mold portion 18. Moreover, rather than supplying surfactant to the bristles of brush 80 by contacting with a pad member, such as pad member 40 which is impregnated with surfactant, it is also possible to contemplate connecting the brush 80 with a supply of surfactant through a suitable conduit or flexible tubing connection leading to a supply source for the surfactant. This would eliminate the necessity for the provision of a pad member, while concurrently simplifying the structure and functioning of the apparatus for surfactant deposition.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An apparatus for applying a surfactant to a first surface of a first mold part of a multi-part mold having the first mold part engageable with a cooperative second mold part for the molding of polymer articles, wherein the surfactant assists in the release of the first and second mold parts and enables removal of excess polymer molding material adherent to the first surface; said apparatus comprising:

a) a support means mounting the first mold part, the support means being movable;

b) applicator means comprising a surfactant applicator, the surfactant applicator being arranged in spaced apart relationship with the support means and the first mold part, said surfactant applicator being positionable in vertical alignment with said first mold part;

c) a pad member disposed adjacent said applicator means containing the surfactant;

d) first actuating means disposed in communication with said applicator means for imparting a displacement to the applicator means to cause the surfactant applicator to contact said pad member and assume a quantity of the surfactant therefrom; and e) second actuating means in communication with said applicator means bringing the applicator means into contact with the first surface to an extent such that the surfactant applicator makes contact with the first surface of said first mold part so as to impart a coating of said surfactant thereto.

2. An apparatus as claimed in claim 1, wherein said applicator means comprises a stamp.

3. An apparatus as claimed in claim 2, wherein the support means and the applicator means are in a vertical arrangement and the first actuating means raises the stamp upwardly into an initial position thereof subsequent to imparting the layer of the surfactant to the first surface of said first mold part; and an operative means in communication with said support means for displacing the support means for the first mold part and successively conveys a second mold support means to mount another mold part.

4. An apparatus as claimed in claim 2, wherein the pad member has a mounting means comprising operative means for alternatingly positioning the pad member between the stamp and the support means and then withdrawing the pad member therefrom to enable the stamp to come into contact with the first surface of said first mold part.

5. An apparatus as claimed in claim 2, wherein said pad member comprises a porous polyethylene member having an average 10 micron pore size, said member being impregnated with a solution containing said surfactant.

6. An apparatus as claimed in claim 5, wherein an upper surface of the porous polyethylene member facing the stamp is covered by a filter having a mesh size with openings within the range of about 0.5 to 2.0 microns.

7. An apparatus as claimed in claim 6, wherein the filter is a nylon filter controlling the amount of surfactant wicked through the porous polyethylene member and expelled through the filter to be contacted by the stamp so as to deposit a predetermined quantity of the surfactant on a contacting surface portion of the stamp.

8. An apparatus as claimed in claim 2, wherein a surface of the stamp contacting the pad member comprises a compound comprising about 90% urethane and 10% silicone.

9. An apparatus as claimed in claim 2, wherein a plurality of the first mold parts are mounted on the support means, each first mold part comprising a front curve for molding a hydrophilic polymer contact lens and wherein said first surface comprises a flange portion on the front curve, each first mold part being operatively aligned with one of a plurality of stamps whereby contact between the front curves and stamps transfers a film of the surfactant to a facing surface on the flange portion.

10. An apparatus as claimed in claim 9, wherein said support means for said first mold parts comprises a mold pallet.

11. An apparatus as claimed in claim 9, wherein spring means mounted on each stamp enables each stamp to floatingly displace relative to the other stamps upon contacting the front curves so as to ensure an even contact to be applied to each front curve and impart a uniform layer of the surfactant.

12. An apparatus as claimed in claim 1, wherein said surfactant comprises a polyethylene oxide sorbitan monooleate.

13. An apparatus as claimed in claim 1, wherein the surfactant comprises an oleate ester of sorbitol and its anhydrides copolymerized with approximately 20 moles of ethylene oxide for each mole of sorbitol and sorbitol anhydrides, of the formula:

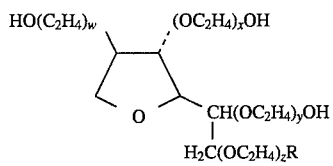

and wherein the sum of w, x, y, and z is 20 and wherein "R" is $(C_{17}H_{33})COO$.

14. An apparatus as claimed in claim 1, wherein said surfactant applicator comprises a brush.

* * * * *